United States Patent
Yoo

(10) Patent No.: US 9,043,178 B2
(45) Date of Patent: May 26, 2015

(54) OPERATING METHOD OF SENSOR NODE, OPERATING METHOD OF DATA SINK IN SENSOR NETWORK, AND SENSOR NETWORK

(75) Inventor: Seung-Mok Yoo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 426 days.

(21) Appl. No.: 13/326,819

(22) Filed: Dec. 15, 2011

(65) Prior Publication Data

US 2012/0158343 A1 Jun. 21, 2012

(30) Foreign Application Priority Data

Dec. 17, 2010 (KR) .................. 10-2010-0129855

(51) Int. Cl.
| | | |
|---|---|---|
| *H04W 84/18* | (2009.01) | |
| *G01D 9/00* | (2006.01) | |
| *G01D 3/02* | (2006.01) | |
| *H04L 29/08* | (2006.01) | |

(52) U.S. Cl.
CPC .............. *G01D 9/005* (2013.01); *G01D 3/022* (2013.01); *H04L 67/12* (2013.01); *H04W 84/18* (2013.01)

(58) Field of Classification Search
CPC . G01D 18/00; G01D 11/245; G01D 5/24476; G01D 5/24485; G01D 2/022; G01D 9/005; H04L 67/12; H04W 48/18
USPC .......................................... 702/104, 116, 93
See application file for complete search history.

(56) References Cited

U.S. PATENT DOCUMENTS

| | | | | |
|---|---|---|---|---|
| 7,020,501 | B1* | 3/2006 | Elliott et al. .................. | 455/574 |
| 7,618,185 | B2* | 11/2009 | Hsieh ............................ | 374/163 |
| 7,830,838 | B2* | 11/2010 | Kohvakka et al. ........... | 370/330 |
| 7,970,871 | B2* | 6/2011 | Ewing et al. ................. | 709/220 |
| 8,125,978 | B2* | 2/2012 | Lim et al. ..................... | 370/351 |
| 8,478,318 | B2* | 7/2013 | Tsai et al. ..................... | 455/500 |
| 2008/0055113 | A1* | 3/2008 | Muro et al. ............. | 340/870.16 |
| 2008/0084294 | A1* | 4/2008 | Zhiying et al. .......... | 340/539.22 |
| 2009/0012633 | A1* | 1/2009 | Liu et al. ........................ | 700/90 |
| 2009/0019056 | A1* | 1/2009 | Othman et al. ................. | 707/10 |
| 2009/0046610 | A1* | 2/2009 | Yamaji .......................... | 370/311 |
| 2010/0054183 | A1* | 3/2010 | Shin et al. ..................... | 370/328 |

FOREIGN PATENT DOCUMENTS

KR  10-2009-0031075  3/2009

OTHER PUBLICATIONS

Kamin Whitehouse et al, "Marionette: Using RPC for Interactive Development and Debugging of Wireless Embedded Networks", IPSN'06, pp. 416-423, Apr. 2006.

* cited by examiner

*Primary Examiner* — John Breene
*Assistant Examiner* — Lynda Dinh
(74) *Attorney, Agent, or Firm* — Staas & Halsey LLP

(57) ABSTRACT

Provided is an operating method of a sensor node. The operating method of a sensor node includes receiving a sensing request, adjusting a sensing condition on the basis of the received sensing request, and sensing according to the adjusted sensing condition.

8 Claims, 10 Drawing Sheets

Fig. 5

| Node ID | A1~A3, B1~B4, C1~C2, D1~D5 |
|---|---|
| Sensor Id | 311~33n |
| Sensing Period | T_PREIOD |
| Sensing Start Time | T_START |

Fig. 8

| Node ID | A1~A3, B1~B4, C1~C2, D1~D5 |
|---|---|
| Sensor Id | 311~33n |
| Sleep Time | T_SLEEP |

Fig. 10

| Node ID | A1~A3, B1~B4, C1~C2, D1~D5 | | | |
|---|---|---|---|---|
| Sensor Id | 331 | 332 | · · · | 33n |
| Sensing Period | T_PERIOD1 | T_PERIOD2 | · · · | T_PERIODn |
| Sensing Start Time | T_START1 | T_START2 | · · · | T_STARTn |
| Sleep Time | T_SLEEP1 | T_SLEEP2 | · · · | T_SLEEPn |

Fig. 11

| Node ID | A1~A3, B1~B4, C1~C2, D1~D5 | | | |
|---|---|---|---|---|
| Sensor Id | 331 | 332 | · · · | 33n |
| Sensing Period | T_PERIOD1 | T_PERIOD2 | · · · | T_PERIODn |
| Sensing Start Time | T_START1 | T_START2 | · · · | T_STARTn |
| Sleep Time | T_SLEEP1 | T_SLEEP2 | · · · | T_SLEEPn |
| Activation State | ON/OFF | ON/OFF | · · · | ON/OFF |

OPERATING METHOD OF SENSOR NODE, OPERATING METHOD OF DATA SINK IN SENSOR NETWORK, AND SENSOR NETWORK

CROSS-REFERENCE TO RELATED APPLICATIONS

This U.S. non-provisional patent application claims priority under 35 U.S.C. §119 of Korean Patent Application No. 10-2010-0129855, filed on Dec. 17, 2010, in the Korean Intellectual Property Office (KIPO), the entire contents of which are hereby incorporated by reference.

BACKGROUND OF THE INVENTION

The present invention disclosed herein relates to a network, and more particularly, to operating methods of a sensor node and a data sink, and a sensor network.

A sensor network is comprised of a plurality of sensor nodes and a data sink. Each of the plurality of sensor nodes includes at least one sensor. Each sensor node performs sensing according to pre-programmed codes, and then transmits sensing results to the data sink. The data sink processes the sensing results collected from the sensor nodes.

The data sink operates an application which processes the sensing results collected from the sensor nodes. The data sink can extract necessary information from the collected sensing results by operating the application.

When types of necessary information become different, the application operated in the data sink may be changed. If the application operated in the data sink is changed, sensing results which the application needs may also be changed. When adjusting the sensing results collected from sensor nodes, the codes programmed into the sensor nodes should be modified.

SUMMARY OF THE INVENTION

The present invention provides an operating method of a sensor node having a variable sensing condition, an operating method of a data sink which is capable of changing a sensing condition, and a sensor network having a variable sensing condition.

Embodiments of the present invention provide operating methods of a sensor node including receiving a sensing request, adjusting a sensing condition on the basis of the received sensing request, and performing sensing operation according to the adjusted sensing condition.

In some embodiments, the sensing request may be received from another sensor node.

In other embodiments, the sensing request may be received from a data sink.

In still other embodiments, the sensing request may comprise a sensor node ID corresponding to a specific sensor node.

In even other embodiments, the sensing request may comprise a sensor ID corresponding to a sensor of a specific sensor node.

In yet other embodiments, the sensing request may comprise a sensing start time.

In further embodiments, the sensing request may comprise a sleep time until a sensing is started.

In still further embodiments, the sensing request may comprise a sensing period.

In other embodiments of the present invention, operating methods of a data sink in a sensor network include obtaining a sensing condition, creating a sensing request on the basis of the obtained sensing condition, transmitting the created sensing request, and receiving a sensing result corresponding to the transmitted sensing request.

In still other embodiments, the transmitting of the created sensing request may comprise transmitting the created sensing request to at least one child node.

In still other embodiments of the present invention, sensor networks include a data sink for transmitting a sensing condition, and at least one sensor node for receiving the sensing condition, performing sensing according to the received sensing condition, and transmitting a sensing result to the data sink.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 5 is a table illustrating sensing conditions;

FIG. 8 is a table illustrating sleep conditions;

FIG. 10 is a table illustrating a first example of sensing conditions maintained in a sensor node; and FIG. 11 is a table illustrating a second example of sensing conditions maintained in a sensor node.

DESCRIPTION OF SPECIFIC EMBODIMENTS

Hereinafter, embodiments of the present invention will be described in detail with reference to the accompanying drawings in such a manner that the technical idea of the present invention may easily be carried out by a person with ordinary skill in the art to which the invention pertains.

Figure 1:
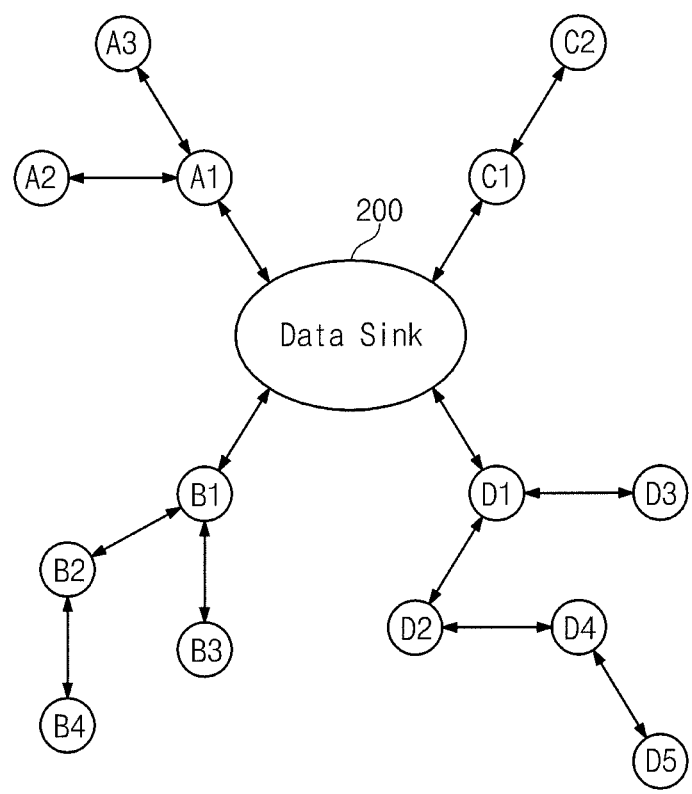
FIG. 1 is a schematic diagram illustrating a sensor network according to an embodiment of the present invention.

FIG. 1 is a schematic diagram illustrating a sensor network 100 according to an embodiment of the present invention. Referring to FIG. 1, the sensor network 100 includes a data sink 200 and a plurality of sensor nodes A1-A3, B1-B4, C1, C2, and D1-D5.

The data sink 200 is connected to the plurality of sensor nodes A1-A3, B1-B4, C1, C2, and D1-D5. Exemplarily, the plurality of sensor nodes A1-A3, B1-B4, C1, C2, and D1-D5 may configure a topology in which the data sink 200 is at the highest level.

Exemplarily, the sensor nodes A1-A3 may be sensor nodes of Group A. The first sensor node A1 of the Group A may be directly connected to the data sink 200. That is, the first sensor node A1 of the Group A may be a child node of the data sink 200. The second and third sensor nodes A2 and A3 of the Group A may be connected to the first sensor node A1. The second and third sensor nodes A2 and A3 of the Group A may be child nodes of the first sensor node A1. In reverse, the first sensor node A1 of the Group A may be a parent node of the second and third sensor nodes A2 and A3.

Sensor nodes B1-B4 may be sensor nodes of Group B. The first sensor node B1 of the Group B may be a child node of the data sink 200. The second and third sensor nodes B2 and B3 of the Group B may be child nodes of the first sensor node B1. The fourth sensor node B4 of the Group B may be a child node of the second sensor node B2.

Sensor nodes C1 and C2 may be sensor nodes of Group C. The first sensor node C1 of the Group C may be a child node of the data sink 200. The second sensor node C2 of the Group C may be a child node of the first sensor node C1.

Sensor nodes D1-D5 may be sensor nodes of Group D. The first sensor node D1 of the Group D may be a child node of the data sink 200. The second and third sensor nodes D2 and D3 of the Group D may be child nodes of the first sensor node D1. The fourth sensor node D4 of the Group D may be a child node of the second sensor node D2. The fifth sensor node D5 of the Group D may be a child node of the fourth sensor node D4.

A topology of the sensor nodes A1-A3, B1-B4, C1, C2, and D1-D5 illustrated in FIG. 1 is shown as an example. Topologies of the sensor nodes A1-A3, B1-B4, C1, C2, and D1-D5 are not limited to the topology illustrated in FIG. 1. The number of sensor nodes is not also limited as illustrated in FIG. 1.

Figure 2:
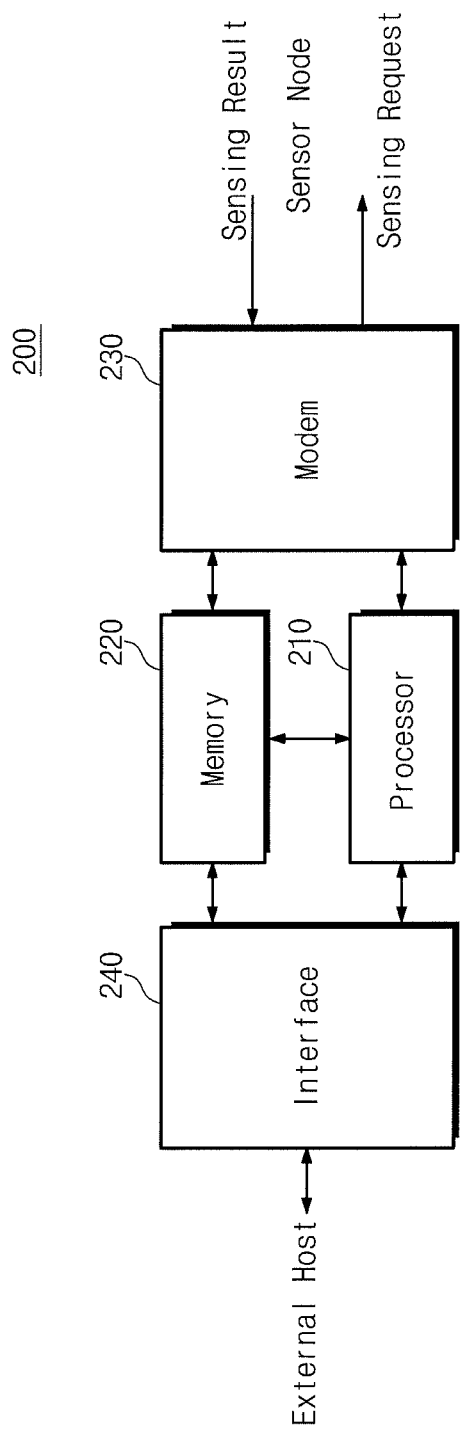
FIG. 2 is a block diagram illustrating a data sink according to an embodiment of the present invention.

FIG. 2 is a block diagram illustrating the data sink 200 according to an embodiment of the present invention. Referring to FIG. 2, the data sink 200 includes a processor 210, a memory 220, a modem 230, and an interface 240.

The processor 210 is configured to control the overall operation of the data sink 200. The memory 220 may operate as an operation memory of the processor 220. The memory 220 may include a storage memory of the data sink 200. The modem 230 is configured to communicate with at least one sensor node according to the control of the processor 210. The interface 240 may communicate with an external host according to the control of the processor 210. The external host may be an electronic device or a user.

The processor 210 may operate an application using the memory 220. Exemplarily, the application operated by the processor 210 and memory 220 may transmit sensing requests to sensor nodes A1-A3, B1-B4, C1, C2, and D1-D5 through the modem 230, and process the sensing results received from the sensor nodes A1-A3, B1-B4, C1, C2, and D1-D5. The application operated by the processor 210 and memory 220 may display collected sensing results, and perform follow-up operations on the basis of the collected sensing results.

Figure 3:
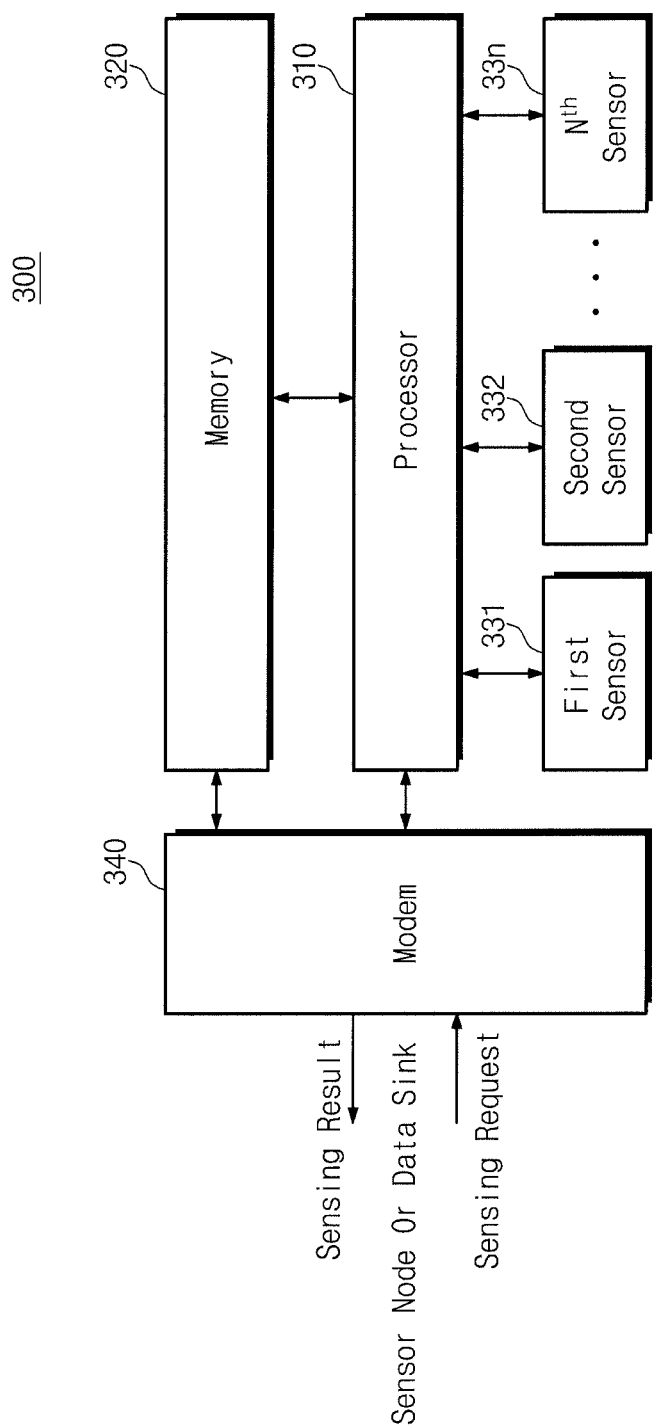
FIG. 3 is a block diagram illustrating a sensor node according to an embodiment of the present invention.

FIG. 3 is a block diagram illustrating a sensor node 300 according to an embodiment of the present invention. Referring to FIG. 3, the sensor node 300 includes a processor 310, a memory 320, the $1^{st}$ to $n^{th}$ sensors 331-33$n$, and a modem 340.

The processor 310 may control the overall operation of the sensor node 300. The memory 320 may operate an operation memory of the processor 310. The memory 320 may include a storage memory of the sensor node 300.

The $1^{st}$ to $n^{th}$ sensors 331-33$n$ operate according to the control of the processor 310. The $1^{st}$ to $n^{th}$ sensors 331-33$n$ may sense different target materials.

The modem 340 may communicate with other sensors or the data sink 200 according to the control of the processor 310. Exemplarily, the modem 340 may receive sensing requests from the data sink 200 or higher-level sensor nodes. The modem 340 may transmit the sensing results created by the sensor node 300 to the data sink 200 or the higher-level sensor nodes. The modem 340 may transmit the sensing requests received from the data sink 200 or the higher-level sensor node to lower-level sensor nodes.

The processor 310 may operate codes using the memory 320. Exemplarily, the codes operated by the processor 310 and the memory 320 may control the $1^{st}$ to $n^{th}$ sensors 331-33$n$ to allow sensing to be performed in response to the sensing requests. The codes operated by the processor 310 and the memory 320 may control the modem 340 to allow sensing results to be transmitted to the data sink 200 or the higher-level sensor node.

Figure 4:
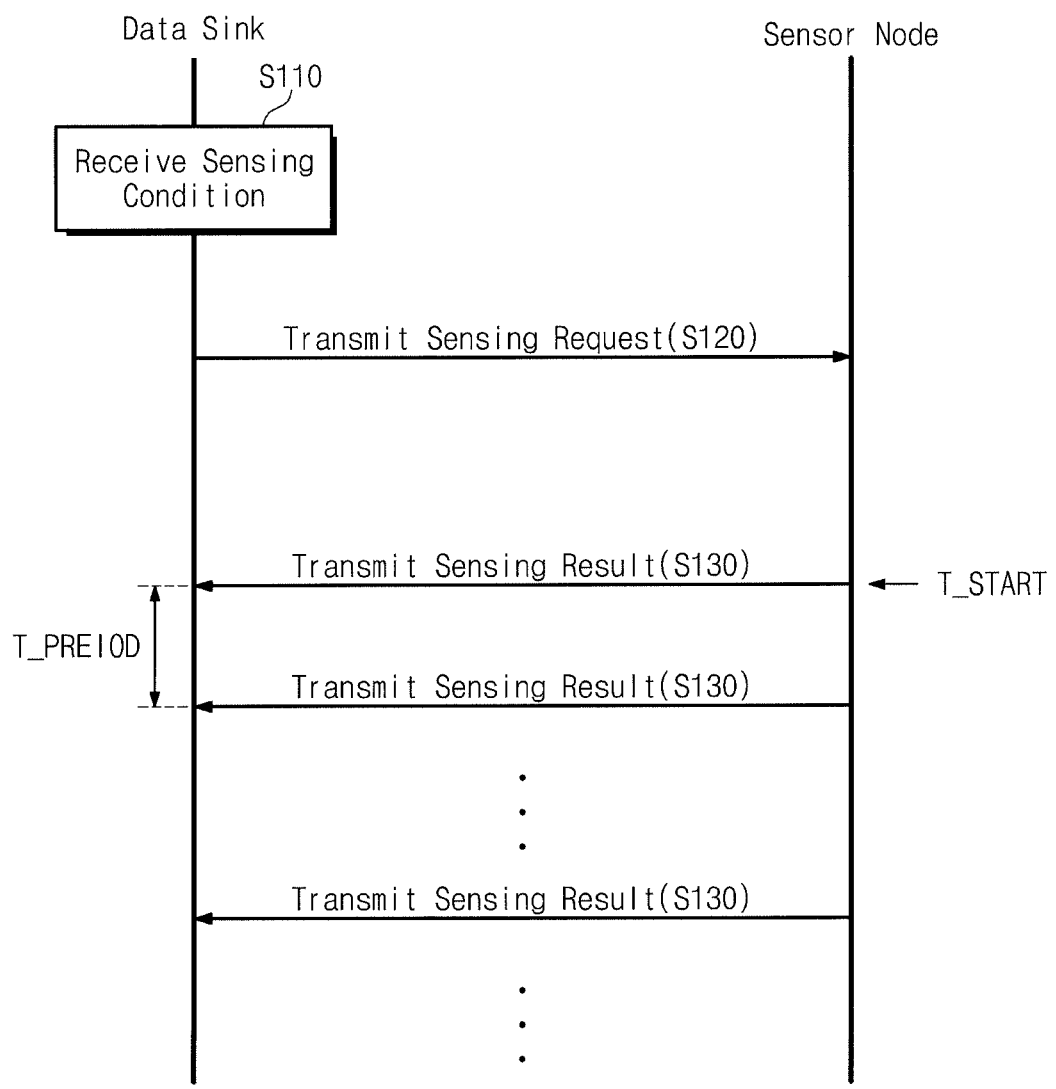
FIG. 4 is a flowchart illustrating a first embodiment of a method of operating a data sink and one of sensor nodes.

FIG. 4 is a flowchart showing a first embodiment of a method of operating the data sink 200 and one of the sensor nodes A1-A3, B1-B4, C1, C2, and D1-D5. Referring to FIGS. 1 through 4, in operation S110, the data sink 200 acquires sensing conditions. Exemplarily, the sensing conditions may be acquired through the interface 240 from an external host. The sensing conditions may be acquired through user input devices such as a keyboard, a mouse, or the like. The sensing conditions may be acquired through communication ports. The sensing conditions may be pre-programmed into the data sink 200. Exemplarily, the sensing conditions may include conditions under which sensor nodes perform sensing. An example of the sensing conditions is illustrated in FIG. 5.

Referring to FIG. 5, the sensing conditions may include node ID. The node ID may include ID of at least one of the sensor nodes A1-A3, B1-B4, C1, C2, and D1-D5 which configure the sensor network 100. The node ID may correspond to IDs of sensor nodes to be controlled to perform sensing according to the sensing conditions among the sensor nodes A1-A3, B1-B4, C1, C2, and D1-D5.

The sensing conditions may include a sensor ID. The sensor ID may include ID of at least one of the sensors 331-33$n$ (see FIG. 3) of respective sensor nodes. The sensor ID may correspond to sensors to be controlled to perform sensing according to controlled sensing conditions among the sensors belonging to the sensor nodes corresponding to the node ID.

The sensing conditions may include a sensing period T_PERIOD and a sensing start time T_START. The sensing start time T_START may be the time at which the sensors of sensor nodes corresponding to the node ID and the sensor ID start sensing. The sensing start time T_START may indicate a specific time. The sensing period T_PERIOD may be periods for which sensors perform sensing.

Referring back to FIGS. 1-4, in operation 5120, the data sink 200 transmits sensing requests to the sensor nodes A1-A3, B1-B4, C1, C2, and D1-D5. Exemplarily, the data sink 200 may generate the sensing requests on the basis of the sensing conditions. The data sink 200 may generate the sensing requests including the sensing conditions.

Among the sensor nodes A1-A3, B1-B4, C1, C2, and D1-D5 of the sensor network 100, the sensor nodes which are not corresponded to the node ID included in the sensing requests may ignore the sensing requests. Among the sensor nodes A1-A3, B1-B4, C1, C2, and D1-D5, sensor nodes (hereinafter referred to as target sensor nodes) corresponding to the node ID included in the sensing requests may adjust sensing conditions according to the received sensing requests.

The target sensor nodes may adjust the sensing conditions of the sensors (hereinafter referred as target sensors) which correspond to the sensor ID included the sensing requests among a plurality of sensors. Exemplarily, the sensing conditions of the target sensors of the target sensor nodes may be adjusted so that sensing can be performed periodically according to the sensing period T_PERIOD from the sensing start time T_START.

In operation 5130, at the sensing start time T_START, the target sensor nodes may perform sensing periodically according to the sensing period T_PERIOD. Sensing results may be transmitted to the data sink 200.

Figure 6:
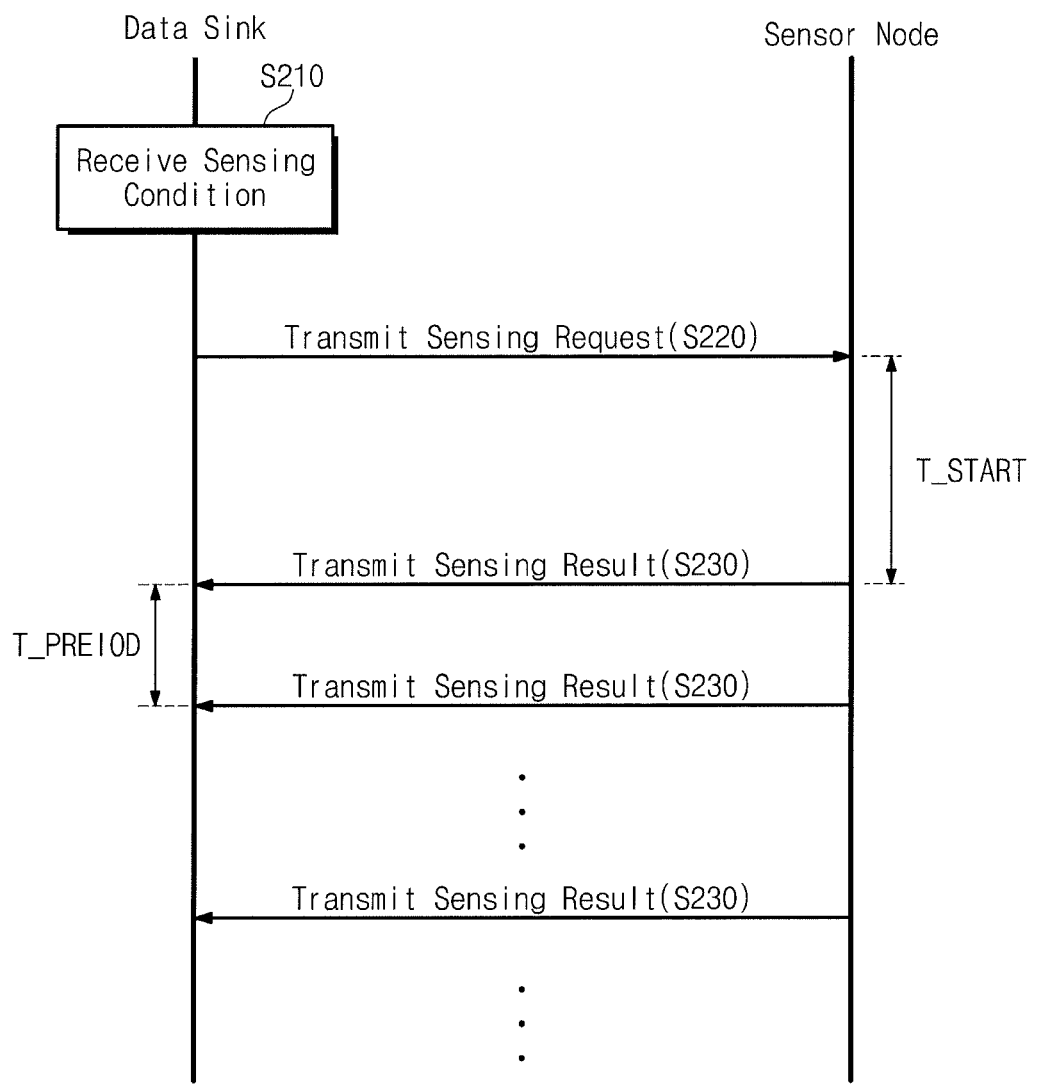
FIG. 6 is a flowchart illustrating a second embodiment of a method of operating a data sink and one of sensor nodes.

FIG. 6 is a flowchart illustrating a second embodiment of a method of operating the data sink 200 and one of the sensor nodes A1-A3, B1-B4, C1, C2, and D1-D5. Referring to FIGS. 1 through 3 and 6, in operation 5210, the data sink 200 acquires sensing conditions. As described with reference to FIG. 5, the sensing conditions may include node ID, sensor ID, sensing start time T_START, and sensing period T_PERIOD.

The node ID, the sensor ID, and the sensing period T_PERIOD may have the same characteristic as that described with reference to FIG. 5. The sensing start time T_START may indicate a time interval.

In operation 5220, the data sink 200 may transmit sensing requests to sensor nodes A1-A3, B1-B4, C1, C2, and D1-D5. The target sensor nodes may operate in response to the received sensing requests. In operation 5230, when the sensing start time T_START passes after the sensing requests are received, the target sensor nodes may perform sensing periodically according to a sensing period T_PERIOD.

Figure 7:
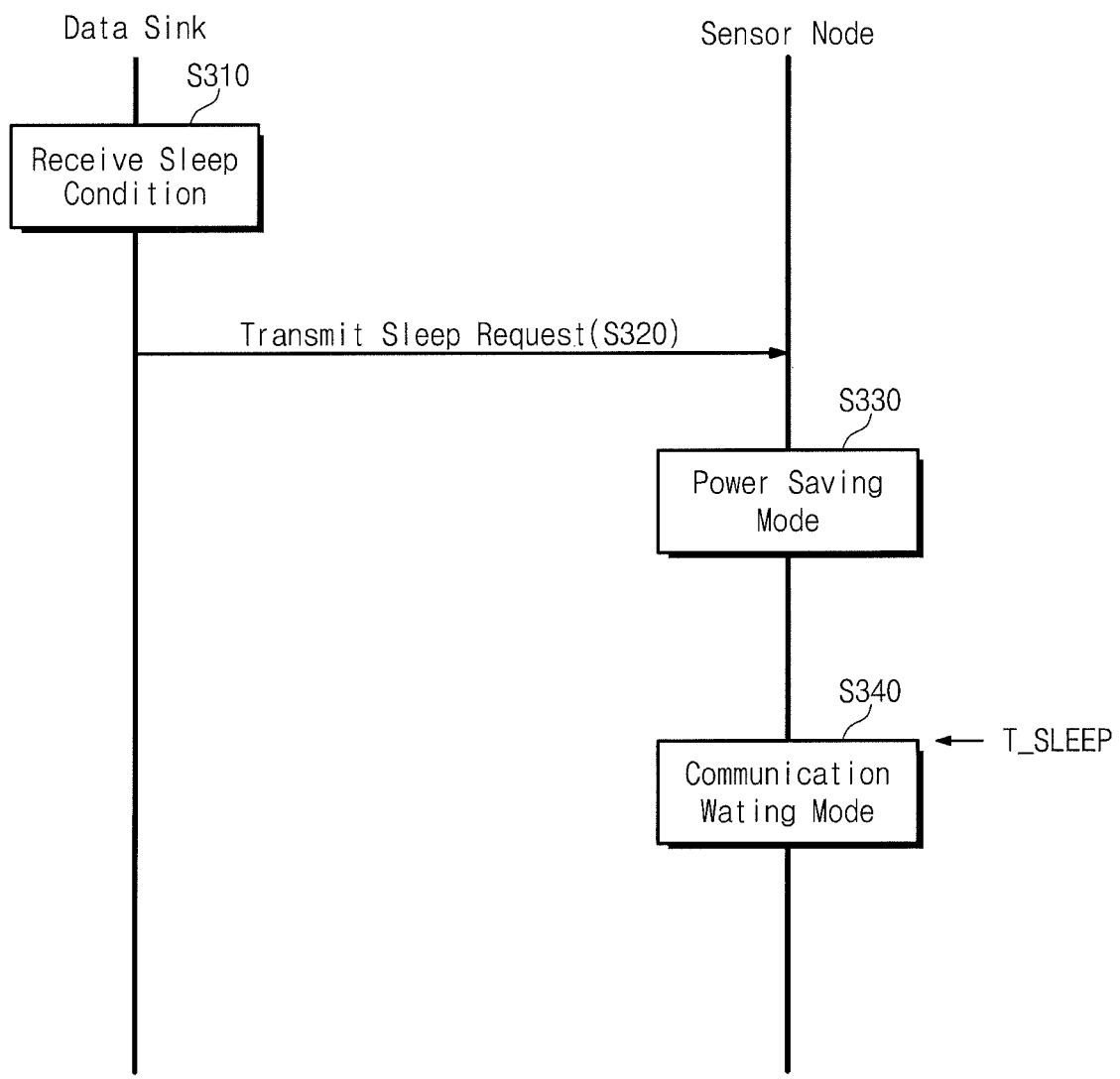
FIG. 7 is a flowchart illustrating a third embodiment of a method of operating a data sink and one of sensor nodes.

FIG. 7 is a flowchart illustrating a third embodiment of a method of operating the data sink 200 and one of sensor nodes A1-A3, B1-B4, C1, C2, and D1-D5. Referring to FIGS. 1 through 3 and 7, in operation 5310, the data sink 200 acquires sleep conditions. Exemplarily, the sleep conditions may be obtained through the interface 240 from an external host. The sleep conditions may be obtained through user input devices such as a keyboard, a mouse, or the like. The sleep conditions may be obtained through a communication port. Exemplarily, the sleep conditions may include a condition under which the sensor node 300 stops sensing and stands by. An example of the sleep conditions is illustrated in FIG. 8.

Referring to FIG. 8, the sleep conditions include node ID, sensor ID, and sleep time T_SLEEP. The node ID and the sensor ID may have the same characteristic as that described with reference to FIG. 5.

The sleep time T_SLEEP may indicate the time when target sensors of target sensor nodes stop sensing and stand by. Sensor nodes may enter power saving modes while standing by. In the power saving modes, sensor nodes may be inactivated. In the power saving modes, sensor nodes may stop sensing and communicating. The sleep time T_SLEEP may indicate a specific time.

Again referring to FIGS. 1 through 3 and 7, in operation 5320, the data sink 200 transmits sleep requests to the sensor nodes A1-A3, B1-B4, C1, C2, and D1-D5. The sleep request may be created according to the sleep conditions. The sleep request may include the sleep conditions.

In operation S330, in response to the received sleep requests, target sensor nodes may make an entry into a power saving mode until they reach the sleep time T_SLEEP. For example, the target sensor nodes may continue to stop sensing and communicating until they reach the sleep time T_SLEEP. In operation S340, when it comes to the sleep time T_SLEEP, the target sensor nodes may enter communication stand-by modes. In communication stand-by modes, the target sensor nodes may wait until sensing or sleep requests are received through the data sink 200 or other sensor nodes.

Figure 9:
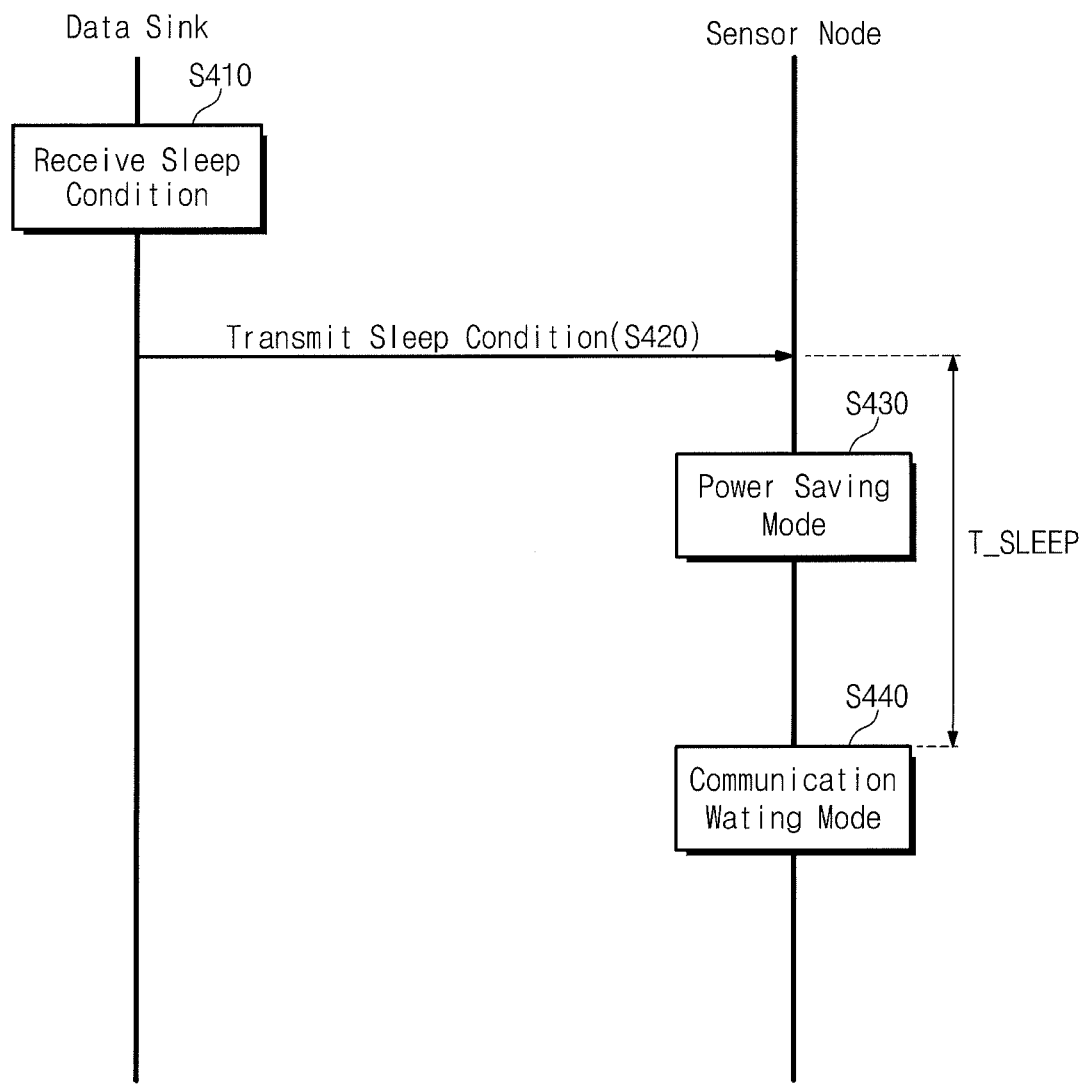
FIG. 9 is a flowchart illustrating a fourth embodiment of a method of operating a data sink and one of sensor nodes.

FIG. 9 is a flowchart illustrating the fourth embodiment of an operating method of the data sink 200 and one of sensor nodes A1-A3, B1-B4, C1, C2, and D1-D5. Referring to FIG. 9, in operation S410, the data sink 200 acquires sleep conditions. As described with reference to FIG. 8, the sleep conditions may include node ID, sensor ID, and sleep time T_SLEEP. The node ID and the sensor ID may have the same characteristic as that described with reference to FIG. 8. The sleep time T_SLEEP may indicate a time interval.

In operation 5420, the data sink 200 may transmit sleep requests to sensor nodes A1-A3, B1-B4, C1, C2, and D1-D5. The target sensor nodes may operate in response to the received sleep requests.

In operation S430, until the sleep time T_SLEEP passes after the sleep requests are received, the target sensor nodes may enter a power saving mode. In power saving mode, the target sensor nodes may continue to stop sensing and communicating. In operation S440, when the sleep time T_SLEEP passes after the sleep requests are received, the target sensor nodes may perform sensing periodically according to the sensing period T-PERIOD.

FIG. 10 is a table showing a first example of sensing conditions maintained in the sensor node 300. Referring to FIG. 10, sensing conditions may include node ID, sensor ID, sensing period, sensing start time, and sleep time.

The node ID may be ID of the sensor node 300.

The sensor IDs 331-33n may be IDs of the sensors included in the sensor node 300.

The sensing period may include plural periods T_PERIOD1-T_PERIODn corresponding to sensor IDs. The $1^{st}$ to $n^{th}$ periods T_PERIOD1-T_PERIODn may be periods for which the $1^{st}$ to $n^{th}$ sensors 331-33n perform sensing.

The sensing start time may include plural start times T_START1-T_STARTn corresponding to sensor IDs. The $1^{st}$ to $n^{th}$ start times T_START1-T_STARTn may be the start times at which the $1^{st}$ to $n^{th}$ sensors 331-33n perform sensing.

The sleep time may include plural sleep times T_SLEEP1-T_SLEEPn corresponding to sensor IDs. The $1^{st}$ to $n^{th}$ sleep times T_SLEEP1-T_SLEEPn may be the times when the $1^{st}$ to $n^{th}$ sensors 331-33n sleep.

FIG. 11 is a table showing the second example of sensing conditions maintained in the sensor node 200. When compared to the sensing conditions of FIG. 10, the sensing conditions illustrated in FIG. 11 further include activation state. The activation state may include information about whether each of sensors 331-33n should be ON or OFF. That is, the data sink 200 (see FIG. 2) may control ON- and OFF-states of the sensors 331-33n of sensor nodes A1-A3, B1-B4, C1, C2, and D1-D5 using sensing requests or sleep requests.

As described above, in the sensor network 100 according to the embodiments of the present invention, the sensor nodes A1-A3, B1-B4, C1, C2, and D1-D5 perform sensing in accordance with sensing requests provided from the data sink 200. Sensing conditions of the sensor network 100 can be adjusted by inputting into the data sink 200 at least one of among the sensor nodes, the sensors, the sensing period, the sensing start time, the sleep time, and the activation state which are related to sensing. There are thus provided an operating method of the sensor node 300 having a variable sensing condition, an operating method of the data sink 200 which is capable of changing a sensing condition, and the sensor network 100 having a variable sensing condition.

As described above, according to the present invention, a data sink transmits sensing requests to sensor nodes, and the sensor nodes perform sensing according to the sensing request. Therefore, it is possible to provide an operating method of a sensor node having a variable sensing condition, an operating method of the data sink which is capable of changing a sensing condition, and a sensor network having a variable sensing condition.

While the specific embodiments have been described in the detailed description of the present invention, various modifications may be made without departing from the spirit and scope of the present invention. Thus, the scope of the present invention is to be determined by the following claims and their equivalents, and shall not be restricted or limited by the foregoing detailed description.

What is claimed is:

1. An operating method of a sensor node including at least one sensor, comprising:
   receiving a sensing request by the sensor node having a variable sensing condition;
   determining whether an identifier included in the sensing request corresponds to the sensor node,
   wherein the sensing request comprises the sensor node identifier corresponding to a specific sensor node, sensing start time, sleep time until the sensing is started, and sensing period;
   upon determining that the identifier corresponds to the sensor node, the variable sensing condition is adjusted on basis of the received sensing request by the sensor node; and
   performing the sensing using the at least one sensor node according to the adjusted sensing condition by the sensor node.

2. The operating method of claim 1, wherein the sensing request is received from another sensor node.

3. The operating method of claim 1, wherein the sensing request is received from a data sink.

4. The operating method of claim 1, wherein the identifier specifies at least two sensor nodes.

5. The operating method of claim 1, wherein the identifier specifies a sensor of the sensor node,
   wherein adjusting of the sensing condition and performing of the sensing are executed in relation to the sensor specified by the identifier.

6. An operating method of a data sink in a sensor network, comprising:
   obtaining a sensing condition;
   creating a sensing request on basis of the obtained sensing condition,
   wherein the sensing request comprises a sensor node identifier corresponding to a specific sensor node, sensing start time, sleep time until the sensing is started, and sensing period;
   transmitting the created sensing request; and
   receiving a sensing result corresponding to the transmitted sensing request,
   wherein the data sink is connected with a plurality of sensor nodes in the data sink, and the data sink processes the sensing results collected from the sensor nodes, wherein the sensing result corresponding to the transmitted sensing request is received from a portion of the plurality of sensor nodes identified by the sensing request.

7. The operating method of claim 6, wherein the transmitting of the created sensing request comprises transmitting the created sensing request to at least one child node.

8. A sensor network, comprising:
   a plurality of sensor nodes; and
   a data sink;
   the data sink transmits sensing request having a sensing condition; and at least one sensor node receiving the sensing condition,
   determining whether to perform sensing, based on the identifier included in the received sensing condition corresponds to the sensor node,
   wherein the sensing request comprises the sensor node identifier corresponding to a specific sensor node, sensing start time, sleep time until the sensing is started, and sensing period;
   upon determining to perform the sensing, performing the sensing according to the received sensing condition, and
   transmitting a sensing result to the data sink, wherein the data sink processes the sensing results collected from the sensor nodes.

* * * * *